United States Patent
Meehan

[19]

[11] Patent Number: 6,115,419
[45] Date of Patent: Sep. 5, 2000

[54] ADAPTIVE DIGITAL BEAMFORMING RECEIVER WITH π/2 PHASE SHIFT TO IMPROVE SIGNAL RECEPTION

[75] Inventor: Joseph P. Meehan, White Plains, N.Y.

[73] Assignee: Philips Electronics North America Corporation, New York, N.Y.

[21] Appl. No.: 09/422,734

[22] Filed: Oct. 21, 1999

[51] Int. Cl.$^7$ .............................. H04B 10/18; H03H 7/30
[52] U.S. Cl. ........................... 375/233; 375/347; 348/725
[58] Field of Search .................... 375/229, 232, 375/233, 347, 348, 349; 348/725, 726

[56] References Cited

U.S. PATENT DOCUMENTS

| | | | |
|---|---|---|---|
| 4,280,128 | 7/1981 | Masak | 343/100 |
| 4,691,205 | 9/1987 | Profera, Jr. | 343/365 |
| 5,230,007 | 7/1993 | Baum | 375/232 |
| 5,274,844 | 12/1993 | Harrison et al. | 455/25 |
| 5,771,439 | 6/1998 | Kenndy, Jr. et al. | 455/63 |
| 5,844,951 | 12/1998 | Proakis et al. | 375/347 |
| 5,884,192 | 3/1999 | Karlsson et al. | 375/347 |

FOREIGN PATENT DOCUMENTS

2705499A1  11/1994  France .

OTHER PUBLICATIONS

"Directionally Constrained Adaptive Beamforming to Enhance Interference Nulling in Direct–Sequence Spread–Spectrum Communication Systems", by Mark A. Jones et al., pp. 106–110, Milcom '93, vol. 1.

Primary Examiner—Temesghen Ghebretinsae
Attorney, Agent, or Firm—Edward W. Goodman

[57] ABSTRACT

There is disclosed an apparatus and method for improving signal reception in a signal receiver. The apparatus comprises a beamforming circuit and a decision feedback equalizer circuit. The beamforming circuit comprises two circuit branches with each circuit branch having a radio frequency (RF) tuner capable of being coupled to an antenna, an intermediate frequency (IF) mixer, a π/2 phase shift circuit, and two feedforward equalizer circuits and an adder circuit. In the decision feedback equalizer circuit a decision device that is coupled to the output of said adder circuit modifies equalizer coefficients in said feedforward equalizer circuits to reduce an interfering signal by electronically forming a null in the direction of the interfering signal.

21 Claims, 4 Drawing Sheets

ADAPTIVE DIGITAL BEAMFORMING RECEIVER WITH π/2 PHASE SHIFT TO IMPROVE SIGNAL RECEPTION

TECHNICAL FIELD OF THE INVENTION

The present invention is directed, in general, to antenna systems and signal receivers and, more specifically, to an apparatus and method for improving the reception of signals such as digital television signals, e.g., ATSC 8-VSB signals.

BACKGROUND OF THE INVENTION

Many digital television receivers have internal antennas or are connected to indoor antennas. In such digital television receivers there can be problems in receiving a good quality signal due to the presence of multiple signal echoes created by obstacles in the room. The multiple signal echoes are inteferer signals that arrive late at the antenna (i.e., multipath delay). In cases where the television receiver is connected to a readily accessible indoor antenna, the indoor antenna may be manually rotated or adjusted to maximize the main signal and minimize the unwanted signals created by the multiple signal echoes of the main signal. In cases where the television receiver has an internal antenna that is not readily accessible, one must manually rotate or adjust the entire television receiver in order to make the desired adjustment.

There is therefore a need for improving the reception of a television signal in television receivers that have internal antennas and in television receivers that are connected to antennas that are located indoors. The desired system for improving the signal reception of such a television signal should not require the manual adjustment of either the antenna or the entire television receiver.

SUMMARY OF THE INVENTION

To address this problem, it is a primary object of the present invention to provide an apparatus and method for automatically adapting a television signal within a television receiver to minimize (or null) interferer signals of the television receiver that are caused by the presence of multiple signal echoes created by obstacles in the room in which the antenna of the television receiver is located.

It is important to realize that the apparatus and method of the present invention is not limited to improving only a television signal. Those skilled in the art will readily understand that the principles of the present invention may also be successfully applied to other types of signals. However, in the descriptions that follow, digital television signals are employed for illustration purposes.

A typical digital television signal is an ATSC 8-VSB signal. The letters ATSC refer to the Advanced Television Standards Committee. The number and letters 8-VSB refer to a television signal modulation format in which the television signal has eight vestigial sidebands. A typical television signal carrier frequency is in the frequency range from 470 MHz to 800 MHz.

The present invention provides an apparatus and method for electronically modifying a television signal that is impaired by the presence of signal echoes of the main signal in order to minimize the signal echoes (i.e., null the interferers). Such electronic modification of a signal is referred to as beamforming.

In the preferred embodiment of the invention, the invention comprises a beamforming circuit and a decision feedback equalizer circuit. The beamforming circuit comprises (1) two circuit branches with each circuit branch having a radio frequency (RF) tuner capable of being coupled to an antenna, an intermediate frequency (IF) mixer, a $\pi/2$ phase shift circuit and two feedforward equalizer circuits and (2) a first adder circuit. The beamforming circuit modifies the input signals to electronically form a beam in the direction of the desired signal and to electronically form a null in the direction of the interfering signal.

A first antenna receives a signal and sends the signal through a first radio frequency (RF) tuner, through a first intermediate frequency (IF) mixer, and through a first analog-to-digital converter to a first feedforward equalizer circuit. The signal that goes through the first feedforward equalizer circuit is an "in-phase" component of the signal. The signal is also passed through a first $\pi/2$ phase shifter and through a second feedforward equalizer circuit. The signal that goes through the second feedforward equalizer circuit is a "quadrature" component of the signal. The phase of the quadrature component of the signal has been shifted from the phase of the original signal by an amount equal to $\pi/2$ radians or ninety degrees (90°).

Similarly, a second antenna receives a signal and sends the signal through a second RF tuner, through a second IF mixer, and through a second analog-to-digital converter to a third feedforward equalizer circuit. The signal that goes through the third feedforward equalizer circuit is an "in-phase" component of the signal. The signal is also passed through a second $\pi/2$ phase shifter and through a fourth feedforward equalizer circuit. The signal that goes through the fourth feedforward equalizer circuit is a "quadrature" component of the signal. The phase of the quadrature component of the signal has been shifted from the phase of the original signal by an amount equal to $\pi/2$ radians or ninety degrees (90°).

The output of the first feedforward equalizer circuit and the output of the second feedforward equalizer circuit and the output of the third feedforward equalizer circuit and the output of the fourth feedforward equalizer circuit are added together in a first adder circuit and are used as the input to the decision feedback equalizer circuit. The beamforming circuit comprises the first circuit branch from the first RF tuner to the first and second feedforward equalizer circuits together with the second circuit branch from the second RF tuner to the third and fourth feedforward equalizer circuits together with the first adder circuit.

The decision feedback equalizer circuit comprises a second adder circuit, a decision device and a feedback equalizer circuit. The second adder circuit is the first element of the decision feedback equalizer circuit. The second adder circuit receives a signal from the first adder circuit of the beamforming circuit and combines that signal with a signal from the feedback equalizer circuit to create an input signal to the decision device. The feedback equalizer circuit is connected to the output of the decision device to sample the output signal that leaves the decision device. The feedback equalizer circuit feeds a modified form of that output signal back to the second adder circuit for use in creating an input signal to the decision device as described above.

The decision device calculates the error in the received signal that is due to an interfering signal arising from an echo of the main signal. The decision device uses an adaptation algorithm to calculate corrections to the signal. The decision device applies those corrections to the signal to electronically form a beam in the direction of the desired signal and to electronically form a null in the direction of the interfering signal. The result is a significant improvement in the quality of signal reception.

The decision device also has control lines that are coupled to the first feedforward equalizer circuit and to the second feedforward equalizer circuit and to the third feedforward equalizer circuit and to the fourth feedforward equalizer circuit and to the feedback equalizer circuit. The decision device can send control signals over the control lines to change any or all of the coefficients in these five equalizer circuits to modify the operating characteristics of the equalizer circuits.

Although the present invention has been described in a form that utilizes two antennas, it is possible to use the present invention in a system that utilizes three or more antennas. The use of three or more antennas, however, causes the system to be more complex and expensive than the two antenna system.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description, it may be advantageous to set forth definitions of certain words and phrases used throughout this patent document: the terms "include" and "comprise" and derivatives thereof mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware, or software, or some combination of at least two of the same. It should be noted that the functionality associated with any particular controller may be centralized or distributed, whether locally or remotely. Definitions for certain words and phrases are provided throughout this patent document. Those of ordinary skill in the art should understand that in many, if not most, instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged signal receiver.

Figure 1:
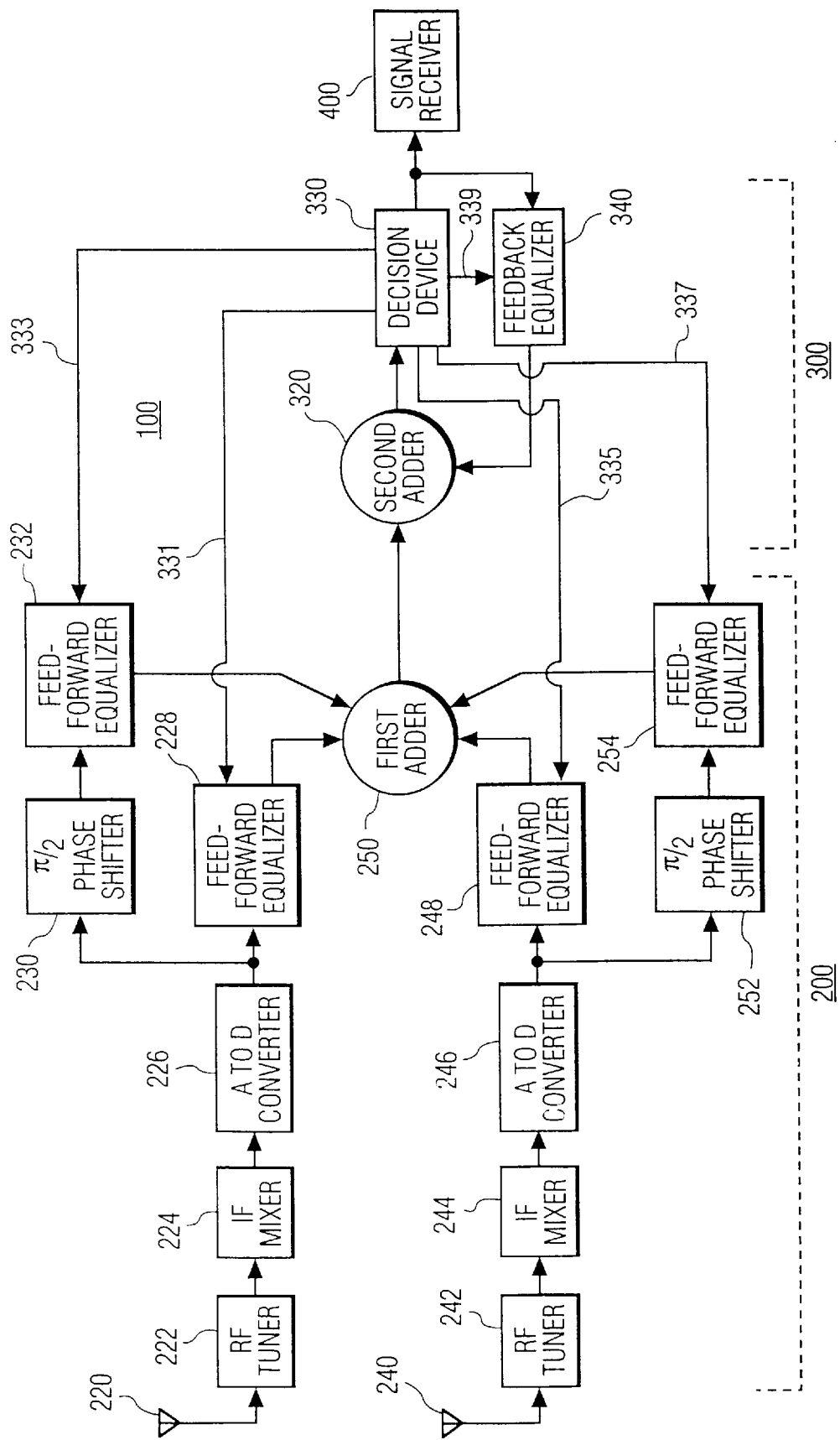
FIG. 1 is a block diagram of an adaptive digital beamforming receiver of the present invention.

FIG. 1 illustrates an adaptive digital beamforming receiver 100, according to a preferred embodiment of the invention. In this embodiment of the invention, the invention comprises beamforming circuit 200 and decision feedback equalizer circuit 300. Beamforming circuit 200 comprises two branches. The first branch of beamforming circuit 200 comprises radio frequency (RF) tuner 222, which is capable of being coupled to antenna 220. RF tuner 222 is coupled to intermediate frequency (IF) mixer 224. Together, RF tuner 222 and IF mixer 224 down-convert the RF signal received from antenna 220 to an analog baseband signal. IF mixer 224 is coupled to analog-to-digital converter 226, which converts the analog baseband signal to a digital baseband signal. Analog-to-digital converter 226 is coupled to first feedforward equalizer circuit 228 and first $\pi/2$ phase shift circuit 230. First $\pi/2$ phase shift circuit 230 is connected to second feedforward equalizer circuit 232. First $\pi/2$ phase shift circuit 230 shifts by 90 degrees the digital baseband signal at the input of second feedforward equalizer 232 with respect to the baseband signal at the input of first feedforward equalizer 228.

Under control of decision device 330, first feedforward equalizer circuit 228 modifies the input signal to form a beam in the direction of the desired signal and to form a null in the direction of the interfering signal. Similarly, under control of decision device 330, second feedforward equalizer circuit 232 modifies the $\pi/2$ phase shifted input signal to form a beam in the direction of the desired signal and to form a null in the direction of the interfering signal.

The second branch of beamforming circuit 200 comprises radio frequency (RF) tuner 242, which is capable of being coupled to antenna 240. RF tuner 242 is coupled to intermediate frequency (IF) mixer 244. Together, RF tuner 242 and IF mixer 244 down-convert the RF signal received from antenna 240 to an analog baseband signal. IF mixer 244 is coupled to analog-to-digital converter 246, which converts the analog baseband signal to a digital baseband signal. Analog-to-digital converter 246 is coupled to third feedforward equalizer circuit 248 and second $\pi/2$ phase shift circuit 252. Second $\pi/2$ phase shift circuit 252 is connected to fourth feedforward equalizer circuit 254. Second $\pi/2$ phase shift circuit 230 shifts by 90 degrees the digital baseband signal at the input of fourth feedforward equalizer 254 with respect to the baseband signal at the input of third feedforward equalizer 252.

Under control of decision device 330, third feedforward equalizer circuit 248 modifies the input signal to form a beam in the direction of the desired signal and to form a null in the direction of the interfering signal. Finally, under control of decision device 330, fourth feedforward equalizer circuit 254 modifies the $\pi/2$ phase shifted input signal to form a beam in the direction of the desired signal and to form a null in the direction of the interfering signal.

The output lines of first feedforward equalizer circuit 228, second feedforward equalizer 232, third feedforward equalizer circuit 248, and fourth feedforward equalizer circuit 254 are coupled to first adder circuit 250. First adder circuit 250 adds together the output signals from feedforward equalizer circuits 228, 232, 248 and 254. The signal that results from the addition of the signals by first adder circuit 250 is an improved signal because it represents a combination of four separate signals, each of which has been modified to form a beam in the direction of the desired signal and modified to form a null in the direction of the interfering signal. Signal information that may have been missing from one of the signals (due to interference) may have been present in one of the other signals. The additive combination of the four signals creates an improved signal that is less susceptible to interferer signals caused by multipath delays.

Antennas 220 and 240 may be vertical, single dipole, omni-directional antennas. Antennas 220 and 240 are spaced apart by a distance in the range from one-twentieth (1/20) of a wavelength of the received signal up to one (1) wavelength of the received signal. For example, in the case of a carrier frequency of 470 MHz, the maximum separation of antennas 220 and 240, would be approximately 0.63 meter or approximately 24.0 inches. Antennas 220 and 240 can be used as components of an internal antenna of a television receiver that uses the present invention.

RF tuners 222 and 242, IF mixers 224 and 244, and analog-to-digital converters 226 and 246 are all conventional devices that are well known in the prior art.

First feedforward equalizer circuit 228 receives from first analog-to-digital converter 226 a digital form of the signal received by antenna 220. First feedforward equalizer circuit 228 comprises circuitry (not shown) for operating a signal processing algorithm that is designed to compensate for the distortions in the amplitude and in the phase that a signal may acquire when that signal is transmitted through a dispersive channel. In this instance, the dispersive channel is the atmosphere.

A number of different types of prior art feedforward equalizer circuits are available that may be used as the first feedforward equalizer circuit 228 of the present invention. One of the simplest types of equalizer circuits is the Linear Transversal Equalizer. The Linear Transversal Equalizer samples values of the input signal in a tapped delay line having N tap points and multiplies those sampled values by N numerical coefficients and then sums the resultant values to form a representation of the signal. The numerical coefficients are numbers that represent weight factors. The number of numerical coefficients can range from one coefficient up to, for example, one hundred coefficients or more. The resultant signal is represented mathematically as follows:

$$\hat{y}_n = \sum_{i=0}^{N-1} a_i x_{1,n-i}$$

where $y_n$ is the output, $x_{1,n}$ is the $n^{th}$ sample of the input signal from the first antenna 220, $a_i$ are the coefficients of first feedforward equalizer 228, and N is the number of coefficients in first feedforward equalizer 228.

Similarly, third feedforward equalizer circuit 248 receives from second analog-to-digital converter 246 a digital form of the signal received by antenna 240. Third feedforward equalizer circuit 248 may be identical in structure and function to the first feedforward equalizer circuit 228. The output signal of the third feedforward equalizer circuit 248 is represented mathematically as follows:

$$\hat{y}_n = \sum_{j=0}^{N-1} b_j x_{2,n-j}$$

where $y_n$ is the output, $x_{2,n}$ is the $n^{th}$ sample of the input signal from the second antenna 240, $b_j$ are the coefficients of third feedforward equalizer 248, and N is the number of coefficients in the third feedforward equalizer 248.

Second feedforward equalizer circuit 232 receives from first π/2 phase shift circuit 230 a phase shifted digital form of the signal received by antenna 220. Second feedforward equalizer circuit 232 is identical in structure and function to the first feedforward equalizer circuit 228. The only difference is that the signal has been phase shifted by π/2 radians. This shift is represented by the factor $e^{j(\pi/2)}$. The output signal of the second feedforward equalizer circuit 232 is represented mathematically as follows:

$$\hat{y}_n = \left( \sum_{i=0}^{N-1} a'_i x_{1,n-i} \right) e^{j\pi/2}$$

where $y_n$ is the output, $x_{1,n}$ is the $n^{th}$ sample of the input signal from the first antenna 220, $a'_i$ are the coefficients of second feedforward equalizer 232, and N is the number of coefficients in the second feedforward equalizer 232.

Similarly, the output signal of the fourth feedforward equalizer circuit 254 is represented mathematically as follows:

$$\hat{y}_n = \left( \sum_{i=0}^{N-1} b'_j x_{2,n-i} \right) e^{j\pi/2}$$

where $y_n$ is the output, $x_{2,n}$ is the $n^{th}$ sample of the input signal from the second antenna 240, $b'_j$ are the coefficients of fourth feedforward equalizer 254, and N is the number of coefficients in the fourth feedforward equalizer 254.

It is understood that the use of the Linear Transversal Equalizer in this description does not limit the invention to this particular type of equalizer. Other types of equalizers may be utilized to practice the invention.

The decision feedback equalizer circuit 300 of the invention comprises a second adder circuit 320, a decision device 330, and a feedback equalizer circuit 340. The second adder circuit 320 of decision feedback equalizer circuit 300 is coupled to the first adder circuit 250 of beamforming circuit 200. The second adder circuit 320 receives from the first adder circuit 250 a signal that is the sum of the output signal from first feedforward equalizer circuit 228 and the output signal from second feedforward equalizer circuit 232 and the output signal from third feedforward equalizer circuit 248 and the output signal from fourth feedforward equalizer circuit 254. As will be described more fully below, second adder circuit 320 also receives an input signal from feedback equalizer circuit 340.

Second adder circuit 320 is coupled to a decision device 330. Decision device 330 may be a digital signal processor (DSP) or other similar type of electronic controller device. Decision device 330 receives a signal from second adder circuit 320.

Decision device 330 performs two operations. The first operation is to make a decision as to which valid symbol the input symbol is closest to (in this case, the eight levels of the 8-VSB signal). This could be called a splicer. It is this valid symbol (i.e., the decision output) that is passed to the feedback equalizer circuit 340. The second operation of decision device 330 is based on the difference of the decision device input and the decision device output (i.e., the symbol error). The symbol error is used in a decision directed adaptation algorithm (e.g., Least Mean Square Algorithm) or in a blind adaptation algorithm (e.g., Constant Modulus Algorithm) to update the equalizer coefficients so that the Mean Square Error (MSE) at the decision device input is reduced.

Decision device 330 may use any one of a number of equalizer adaptation algorithms well known in the prior art. In the preferred embodiment of the invention, the equalizer adaptation algorithm used is the Least Mean Squares (LMS) method. It is referred to as the LMS algorithm. Another equalizer adaptation algorithm available for use utilizes the Recursive Least Squares (RLS) method. It is referred to as the RLS algorithm. Other similar algorithms are also available for use. The description of the preferred embodiment of the invention is not intended to limit the type of algorithm that may be used in accordance with the concept of the invention.

The adaptation algorithm calculates the amount of error in the amplitude and phase of the signal. The adaptation algorithm then calculates the amount of correction needed to correct the errors. The decision device 330 then changes the values of the coefficients in first feedforward equalizer 228, second feedforward equalizer 232, third feedforward equalizer 248, fourth feedforward equalizer 254, and feedback equalizer 340. In this manner, decision device 330 modifies the signal to create an improved signal by electronically forming a beam in the direction of the desired signal and by electronically forming a null in the direction of the interfering signal.

Feedback equalizer circuit 340 is coupled to the output of decision device 330 for sampling the output signal of decision device 330. Feedback equalizer circuit 340 also has an output coupled to an input of second adder circuit 320. This allows second adder circuit 320 to access the output signal of feedback equalizer circuit 340. Second adder circuit 320 subtracts the output signal of feedback equalizer circuit 340 from the signal that is the sum of the output signal from first feedforward equalizer circuit 228 and the output signal from second feedforward equalizer circuit 248 and the output signal from third feedforward equalizer circuit 248 and the output signal from fourth feedforward equalizer circuit 254.

Feedback equalizer circuit 340 may also have the same form and structure of the first feedforward equalizer circuit 228 and the second feedforward equalizer circuit 248 and the third feedforward equalizer circuit 248 and the fourth feedforward equalizer circuit 254. The output signal of feedback equalizer circuit 340 is represented mathematically as follows:

$$\hat{y}_n = \sum_{k=1}^{M} c_k \hat{y}_{n-k}$$

where $y_n$ is the output, $y_{n-k}$ is the input signal from the decision device 330, $c_k$ are the coefficients of feedback equalizer circuit 340, and M is the number of coefficients in feedback equalizer circuit 340.

Therefore, the input signal to the decision device 330 is given by the mathematical expression:

$$\hat{y}_n = \left( \sum_{i=0}^{N-1} a_i x_{1,n-i} + \sum_{j=0}^{N-1} b_j x_{2,n-j} \right) +$$

$$\left( \sum_{i=0}^{N-1} a'_i x_{1,n-i} + \sum_{j=0}^{N-1} b'_j x_{2,n-j} \right) e^{j\pi/2} - \sum_{k=1}^{M} c_k \hat{y}_{n-k}$$

where $y_n$ is the estimated output, $x_{1,n}$ is the $n^{th}$ sample of the input signal from first antenna 220, $x_{2,n}$ is the $n^{th}$ sample of the input signal from second antenna 240, and $y_{n-k}$ is the input signal from the decision device 330. The values $a_i$ are the coefficients of the first feedforward equalizer circuit 228, the values $a'_i$ are the coefficients of the second feedforward equalizer circuit 248, the values $b_j$ are the coefficients of the third feedforward equalizer circuit 248, the values $b'_j$ are the coefficients of the fourth feedforward equalizer circuit 254, and the values $c_k$ are the coefficients of the feedback equalizer circuit 340. The value N is the number of coefficients in feedforward equalizer circuit 228, feedforward equalizer circuit 232, feedforward equalizer circuit 248, and feedforward equalizer circuit 254. The value M is the number of coefficients in the feedback equalizer circuit 340. This expression represents the input to the decision device 330.

Decision device 330 utilizes the above described input value for $y_n$ to sequentially set up and solve a set of linear equations to determine corrected values for the coefficients of each of the five equalizer circuits, that is, for the first feedforward equalizer circuit 228, and for the second feedforward equalizer circuit 232, and for the third feedforward equalizer circuit 248, and for the fourth feedforward equalizer circuit 254, for the feedback equalizer circuit 340.

The coefficients (also referred to as tap weights) of an equalizer can be adjusted to minimize the Mean Square Error (MSE), $\epsilon_k$, according to:

$$\epsilon_k = I_k = \hat{I}_k$$

where $I_k$ is the $k^{th}$ information symbol transmitted and $\hat{I}_k$ is the estimate of the $k^{th}$ symbol at the output of the equalizer. The estimated symbol $\hat{I}_k$ is expressed as $$\hat{I}_k = \sum_{j=-\infty}^{\infty} d_j x_{k-j}$$

where $x_k$ is the sampled channel output and $d_j$ are the equalizer coefficients.

A set of linear equations can be set up based on the orthogonality principle in mean-square estimation. The equalizer coefficients, $d_j$, are chosen such that the Mean Square Error (MSE), $\epsilon_k$, is orthogonal to the complex conjugate of the transmitted symbol sequence, $x_k^*$, according to:

$$\sum_{j=-\infty}^{\infty} d_j E(x_{k-j} x_{k-l}^*) = E(\hat{y}_k x_{k-l}^*) \qquad -\infty < l < \infty$$

where $d_j$ are the equalizer coefficients, $x_j$ are the equalizer inputs, $x_j^*$ is the complex conjugate, $E(\bullet)$ is the expected value and $\hat{y}_k$ is the estimated output of the equalizer. This equation involves the statistical autocorrelation function of the input signal and the cross correlation function between the input and predicted signal.

The above linear simultaneous equations have to be solved to find the optimum equalizer tap coefficients. This means that for an N tap equalizer, there are N linear simultaneous equations to be solved.

An adaptation algorithm such as the Least Mean Square (LMS) algorithm is used to solve the above equation. In the LMS algorithm an estimate of the gradient of the Mean Square Error (MSE) can be found and the opposite of this taken to update the tap values so that the MSE moves closer to the minimum. The LMS algorithm is represented by the equation:

$$d_n(k+1)=d_n(k)-\Delta e_k x^*(kT-nT), n=0,1,2, \ldots ,N-1$$

where $d_n(k)$ is the $n^{th}$ equalizer tap at time k, and T is the signaling interval, and $e_k$ is the error signal, and $\Delta$ is a variable adaptation constant (step size). The value $e_k x^*(kT-nT)$ is an estimate of the gradient vector obtained from the data. The LMS algorithm does not require knowledge of the signal's statistics or of the noise. The new equalizer coefficient is deduced from the previous value of the coefficient minus an error function. The greater $\Delta$ is, the faster the convergence, and the smaller $\Delta$ is, the slower the convergence. The LMS algorithm is easy to implement but slow to converge.

After decision device 330 has calculated the new equalizer coefficients for the equalizer circuits, decision device 330 sends a new equalizer coefficient to first feedforward equalizer circuit 228 via control line 331. Decision device 330 also sends a new equalizer coefficient to second feedforward equalizer circuit 232 via control line 333, sends a new equalizer coefficient to third feedforward equalizer circuit 248 via control line 335, sends a new equalizer coefficient to fourth feedforward equalizer circuit 254 via control line 337, and sends a new equalizer coefficient to feedback equalizer 340 via control line 339.

The iterative process continues until the mean square error is minimized. In this manner the decision device 330 creates an improved signal for signal receiver 400.

In order to clearly show how the present invention works in a video device, a video device will be briefly described. For purposes of illustration, the video device that will be described is a high resolution television signal receiver. It is to be borne in mind that the invention is not limited to use in a television signal receiver but may be used in any type of video device, including, without limitation, personal computer monitors, laptop computer monitors, handheld computer monitors, handheld video devices, and any type of device having the ability to display a video signal.

Figure 2:
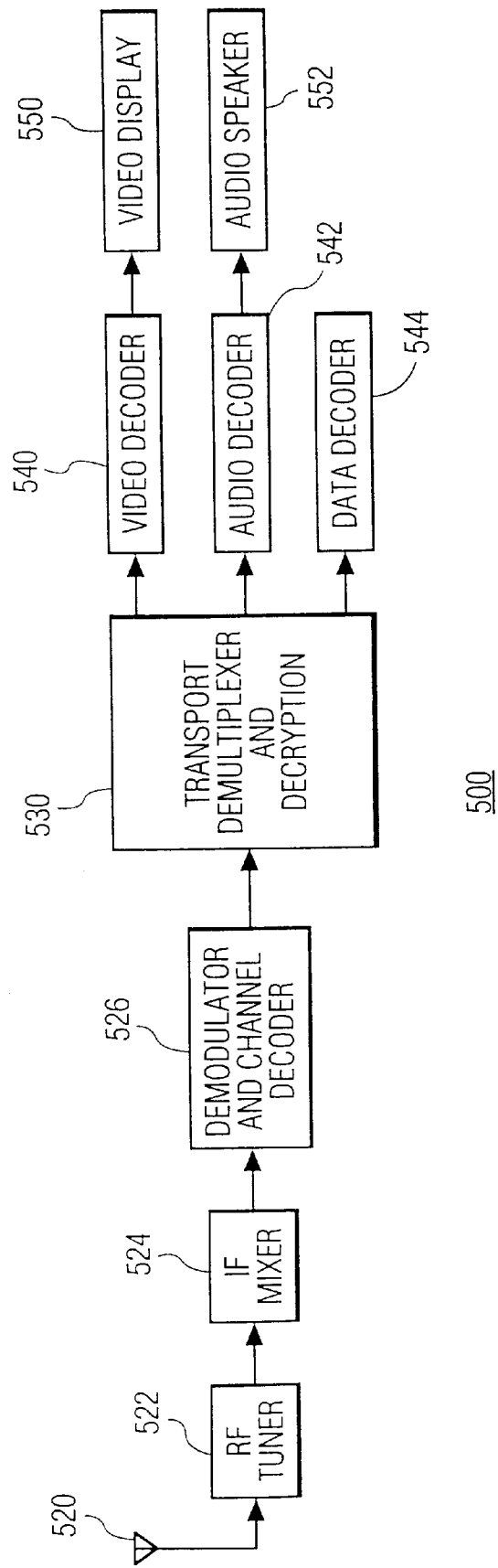
FIG. 2 is a block diagram of a high definition television signal receiver in which the present invention may be embodied.

FIG. 2 is a block diagram of a high definition television signal receiver, in which the present invention may be embodied. The television signal is received by antenna 520 and sent to a RF tuner 522 and then to an IF mixer 524. The signal is then sent to a demodulator and channel decoder circuit 526. The signal is then sent to a transport demultiplexer and decryption circuit 530 where the audio, video and data portions of the signal are separated from each other. The video portion of the signal is sent to a video decoder 540. The audio portion of the signal is sent to an audio decoder 542. The data portion of the signal is sent to a data decoder 544. The video portion of the signal is sent to a video display circuit 550 and the audio portion of the signal is sent to an audio speaker unit 552.

Figure 3:
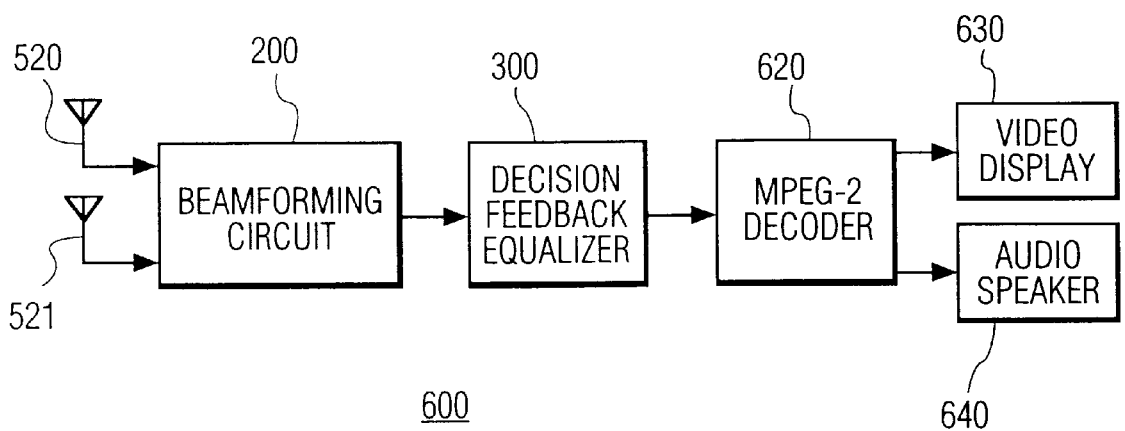
FIG. 3 is a block diagram of an embodiment of the present invention in a signal receiver of a video device.

FIG. 3 is a block diagram of an embodiment of the present invention in a video device 600. The video device 600 is a television signal receiver having a first antenna 520 and a second antenna 521. The RF tuner 522 and the IF mixer 524 of the television signal receiver 500 have been replaced with the beamforming circuit 200 and with the decision feedback equalizer circuit 300 of the present invention. The video device 600 shown in FIG. 3 is an exemplary adaptive digital beamforming receiver of the present invention.

In video device 600 the decision feedback equalizer circuit 300 sends the improved signal of the present invention to an MPEG-2 decoder 620. The MPEG-2 decoder 620 is of a type well known in the prior art. The video portion of the signal is sent to a video display unit 630. The audio portion of the signal is sent to an audio speaker 640.

Figure 4:
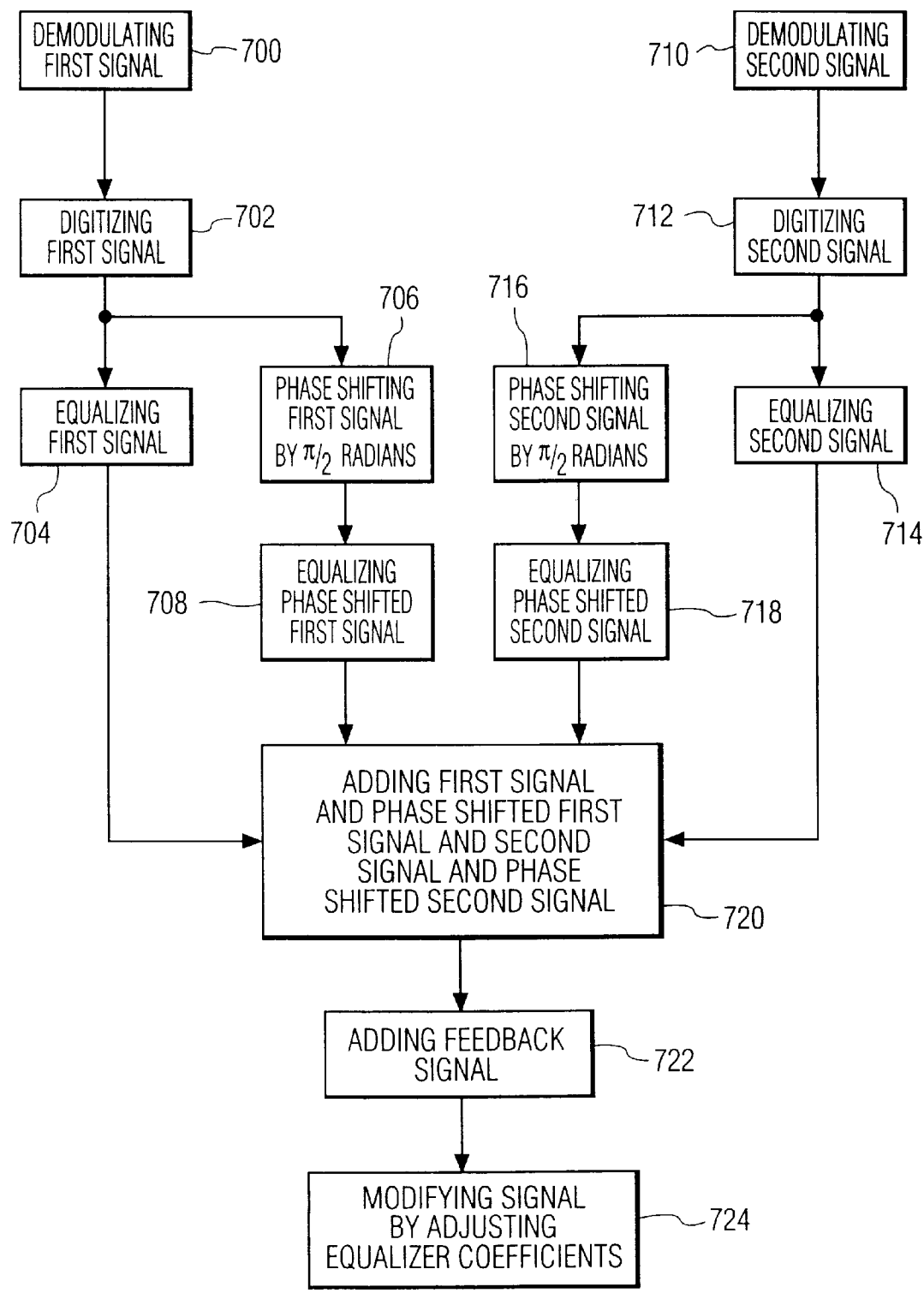
FIG. 4 is a flow diagram illustrating the operation of an exemplary adaptive beamforming receiver in accordance with one embodiment of the present invention.

FIG. 4 is a flow diagram illustrating the operation of an exemplary adaptive digital beamforming receiver in accordance with one embodiment of the present invention. Step 700 comprises the step of demodulating a first analog signal from a first antenna. Step 702 comprises the step of converting the first analog signal to a digital signal. Step 704 comprises the step of modifying the first signal in a first feedforward equalizer to correct distortions in the first signal.

Similarly, step 706 comprises the step of demodulating a second analog signal from a second antenna. Step 708 comprises the step of converting the second analog signal to a digital signal. Step 710 comprises the step of modifying the second signal in a second feedforward equalizer circuit to correct distortions in the second signal.

Step 712 comprises the step of adding the modified first signal and the modified second signal. Step 714 comprises the step of adding to the sum of the modified first signal and the modified second signal a feedback signal from a feedback equalizer circuit to create an improved signal.

Step 716 comprises the step of modifying the improved signal in a decision device having an adaptive algorithm by adjusting the coefficients of the first feedforward equalizer circuit, and by adjusting the coefficients of the second feedforward equalizer circuit, and by adjusting the coefficients of the feedback equalizer circuit.

Although the present invention has been described in detail, those skilled in the art should understand that they can make various changes, substitutions and alterations herein without departing from the spirit and scope of the invention in its broadest form.

What is claimed is:

1. An apparatus for improving signal reception in a signal receiver having a first antenna and a second antenna comprising:

a first feedforward equalizer circuit capable of being coupled to said first antenna, said first feedforward equalizer circuit comprising equalization circuitry capable of modifying a signal from said first antenna to correct distortions in said signal; and a second feedforward equalizer circuit capable of being coupled to said first antenna through a first π/2 phase shift circuit, said second feedforward equalizer circuit comprising equalization circuitry capable of modifying a signal from said first antenna to correct distortions in said signal; and a third feedforward equalizer circuit capable of being coupled to said second antenna, said second feedforward equalizer circuit comprising equalization circuitry capable of modifying a signal from said second antenna to correct distortions in said signal; and a fourth feedforward equalizer circuit capable of being coupled to said second antenna through a second π/2 phase shift circuit, said fourth feedforward equalizer circuit comprising equalization circuitry capable of modifying a signal from said second antenna to correct distortions in said signal;

an adder having a first input coupled to said first feedforward equalizer circuit, a second input coupled to said second feedforward equalizer circuit, a third input coupled to said third feedforward equalizer circuit, and a fourth input coupled to said fourth feedforward equalizer circuit, wherein said adder is capable of adding said modified signal from said first feedforward equalizer circuit, said modified signal from said second feedforward equalizer circuit, said modified signal from said third feedforward equalizer circuit, and said modified signal from said fourth feedforward equalizer circuit; and a decision device coupled to an output of said adder and capable of monitoring a signal on said adder output, wherein said decision device, in response to a value of said adder output signal, modifies equalizer coefficients in said first feedforward equalizer circuit and said second feedforward equalizer circuit and said third feedforward equalizer circuit and said fourth feedforward equalizer circuit to reduce interference signals from at least one of said first feedforward equalizer circuit and said second feedforward equalizer circuit and said third feedforward equalizer circuit and said fourth feedforward equalizer circuit.

2. An apparatus as set forth in claim 1 further comprising a feedback equalizer circuit coupled to said decision device, said feedback equalizer circuit comprising equalization circuitry modifying an output signal of said decision device, wherein a first input of a second adder is coupled to an output of said feedback equalizer circuit.

3. An apparatus as set forth in claim 1 wherein said decision device comprises a microprocessor capable of executing an adaptation algorithm.

4. An apparatus as set forth in claim 3 wherein said adaptation algorithm utilizes a least mean squares method.

5. An apparatus as set forth in claim 3 wherein said microprocessor is capable of adjusting said equalizer coefficients in said first feedforward equalizer circuit, said second feedforward equalizer circuit, said third feedforward equalizer circuit, said fourth feedforward equalizer circuit, and said feedback equalizer circuit.

6. An apparatus as set forth in claim 1 wherein at least one of said first feedforward equalizer circuit, said second feedforward equalizer circuit, said third feedforward equalizer circuit, said fourth feedforward equalizer circuit, and said feedback equalizer circuit comprises a linear transversal equalizer.

7. An apparatus as set forth in claim 1 wherein said first feedforward equalizer circuit and said second feedforward equalizer circuit are coupled to said first antenna by first RF receiver circuitry capable of receiving an RF signal from said first antenna and converting said RF signal to a digital baseband signal.

8. An apparatus as set forth in claim 1 wherein said third feedforward equalizer circuit and said fourth feedforward equalizer circuit are coupled to said second antenna by second RF receiver circuitry capable of receiving an RF signal from said second antenna and converting said RF signal to a digital baseband signal.

9. A television receiver comprising:
first RF receiver circuitry capable of being coupled to a first antenna, receiving a first RF signal from said first antenna, and converting said first RF signal to a first digital baseband signal; and
second RF receiver circuitry capable of being coupled to a second antenna, receiving a second RF signal from said second antenna, and converting said second RF signal to a second digital baseband signal; and
a first feedforward equalizer circuit capable receiving said first digital baseband signal, said first feedforward equalizer circuit comprising equalization circuitry capable of modifying said first digital baseband signal to minimize distortions therein; and a second feedforward equalizer circuit capable receiving said first digital baseband signal through a first $\pi/2$ phase shift circuit, said second feedforward equalizer circuit comprising equalization circuitry capable of modifying said first $\pi/2$ phase shifted digital baseband signal to minimize distortions therein; and a third feedforward equalizer circuit capable of receiving said second digital baseband signal, said second feedforward equalizer circuit comprising equalization circuitry capable of modifying said second digital baseband signal to minimize distortions therein; and a fourth feedforward equalizer circuit capable receiving said second digital baseband signal through a second $\pi/2$ phase shift circuit, said second feedforward equalizer circuit comprising equalization circuitry capable of modifying said second $\pi/2$ phase shifted digital baseband signal to minimize distortions therein; and an adder having a first input coupled to said first feedforward equalizer circuit, a second input coupled to said second feedforward equalizer circuit, a third input coupled to said third feedforward equalizer circuit, and a fourth input coupled to said fourth feedforward equalizer circuit, wherein said adder is capable of adding said modified signal from said first feedforward equalizer circuit, said modified signal from said second feedforward equalizer circuit, said modified signal from said third feedforward equalizer circuit, and said modified signal from said fourth feedforward equalizer circuit; and a decision device coupled to an output of said adder and capable of monitoring a signal on said adder output, wherein said decision device, in response to a value of said adder output signal, modifies equalizer coefficients in at least one of said first feedforward equalizer circuit and said second feedforward equalizer circuit and said third feedforward equalizer circuit and said fourth feedforward equalizer circuit to minimize distortions in at least one of said first feedforward equalizer circuit, said second feedforward equalizer circuit, said third feedforward equalizer circuit, and said fourth feedforward equalizer circuit;

an MPEG-2 decoder coupled to said decision device capable of receiving and decoding an output signal from said decision device; and a video display unit coupled to said MPEG-2 decoder capable of receiving and displaying a decoded output signal from said MPEG-2 decoder.

10. A television receiver as set forth in claim 9 further comprising a feedback equalizer circuit coupled to said decision device, said feedback equalizer circuit comprising equalization circuitry modifying an output signal of said decision device, wherein a first input of a second adder is coupled to an output of said feedback equalizer circuit.

11. A television receiver as set forth in claim 9 wherein said decision device comprises a microprocessor capable of executing an adaptation algorithm.

12. A television receiver as set forth in claim 11 wherein said adaptation algorithm utilizes a least mean squares method.

13. A television receiver as set forth in claim 11 wherein said microprocessor is capable of adjusting said equalizer coefficients in said first feedforward equalizer circuit, said second feedforward equalizer circuit, said third feedforward equalizer circuit, said fourth feedforward equalizer circuit, and said feedback equalizer circuit.

14. A television receiver as set forth in claim 9 wherein at least one of said first feedforward equalizer circuit, said second feedforward equalizer circuit, said third feedforward equalizer circuit, said fourth feedforward equalizer circuit, and said feedback equalizer circuit comprises a linear transversal equalizer.

15. A method for improving signal reception in a signal receiver having a first antenna and a second antenna comprising the steps of:

modifying a first signal from said first antenna in a first feedforward equalizer circuit to correct distortions in said first signal;

phase shifting unmodified first signal by a phase of $\pi/2$ radians;

modifying said phase shifted first signal in a second feedforward equalizer to correct distortions in said phase shifted first signal;

modifying a second signal from said second antenna in a third feedforward equalizer circuit to correct distortions in said second signal;

phase shifting unmodified second signal by a phase of $\pi/2$ radians;

modifying said phase shifted second signal in a fourth feedforward equalizer to correct distortions in said phase shifted second signal;

adding said modified first signal from said first feedforward equalizer circuit and said modified phase shifted first signal from said second feedforward equalizer circuit and said modified second signal from said third feedforward equalizer circuit and said modified phase shifted second signal from said fourth feedforward equalizer circuit to form a sum of said modified signals;

monitoring in a decision device said sum of said modified signals; and in response to a value of said sum of said modified signals, modifying equalizer coefficients in said first feedforward equalizer circuit and said second feedforward equalizer circuit and said third feedforward equalizer circuit and said fourth feedforward equalizer circuit to reduce interference signals from at least one of said first feedforward equalizer circuit and said second feedforward equalizer circuit and said third feedforward equalizer circuit and said fourth feedforward equalizer circuit.

16. The method as set forth in claim 15 wherein said step of modifying equalizer coefficients comprises the steps of:

calculating corrections to said sum of said modified signals with an adaptation algorithm; and changing the values of portions of said sum of said modified signals using said calculated corrections.

17. The method as set forth in claim 16 wherein the step of calculating corrections to said signal with an adaptation algorithm is carried out using an adaptation algorithm that utilizes a least mean squares method.

18. A method for improving signal reception in a signal receiver having a first antenna and a second antenna comprising the steps of:

down-converting an RF signal received by said first antenna to a first digital baseband signal;

down-converting an RF signal received by said second antenna to a second digital baseband signal;

modifying said first digital baseband signal in a first feedforward equalizer circuit to correct distortions in said first digital baseband signal;

phase shifting said first digital baseband signal by a phase of $\pi/2$ radians;

modifying said phase shifted first digital baseband signal in a second feedforward equalizer circuit to correct distortions in said phase shifted first digital baseband signal;

modifying said second digital baseband signal in a second feedforward equalizer circuit to correct distortions in said second digital baseband signal;

phase shifting said second digital baseband signal by a phase of $\pi/2$ radians;

modifying said phase shifted second digital baseband signal in a fourth feedforward equalizer circuit to correct distortions in said phase shifted second digital baseband signal;

adding said modified first digital baseband signal and said modified phase shifted first digital baseband signal and said modified second digital baseband signal and said modified phase shifted second digital baseband signal to produce a composite baseband signal;

monitoring in a decision device said composite baseband signal; and in response to a value of said composite baseband signal, modifying equalizer coefficients in said first feedforward equalizer circuit and said second feedforward equalizer circuit and said third feedforward equalizer circuit and said fourth feedforward equalizer circuit to reduce interference signals in said composite baseband signal.

19. The method as set forth in claim 18 wherein said step of modifying equalizer coefficients comprises the steps of:

calculating corrections to said sum of said modified signals with an adaptation algorithm; and changing the values of portions of said sum of said modified signals using said calculated corrections.

20. The method as set forth in claim 19 wherein the step of calculating corrections to said signal with an adaptation algorithm is carried out using an adaptation algorithm that utilizes a least mean squares method.

21. A method for improving signal reception in a signal receiver having a first antenna and a second antenna comprising the steps of:

demodulating a first analog signal from a first antenna;

converting said first analog signal to a first digital signal;

modifying said first digital signal in a first feedforward equalizer circuit to correct distortions in said first signal;

phase shifting said first digital signal by a phase of $\pi/2$ radians;

modifying said phase shifted first digital signal in a second feedforward equalizer circuit to correct distortions in said phase shifted first signal;

demodulating a second analog signal from a second antenna;

converting said second analog signal to a second digital signal;

modifying said second digital signal in a third feedforward equalizer circuit to correct distortions in said second digital signal;

phase shifting said second digital signal by a phase of $\pi/2$ radians;

modifying said phase shifted second digital signal in a fourth feedforward equalizer circuit to correct distortions in said phase shifted second digital signal;

adding the modified first digital signal and the modified phase shifted first digital signal and the modified second digital signal and the modified phase shifted second digital signal;

adding to the sum of said modified first digital signal and said modified phase shifted first digital signal and said modified second digital signal and said modified phase shifted second digital signal a feedback signal from a feedback equalizer circuit to create a combined signal; and modifying the combined signal in a decision device having an adaptive algorithm by adjusting the coefficients of said first feedforward equalizer circuit, by adjusting the coefficients of said second feedforward equalizer circuit, by adjusting the coefficients of said third feedforward equalizer circuit, by adjusting the coefficients of said fourth feedforward equalizer circuit, and by adjusting the coefficients of said feedback equalizer circuit.

* * * * *